(12) United States Patent
Akkarakaran et al.

(10) Patent No.: US 8,804,627 B2
(45) Date of Patent: Aug. 12, 2014

(54) METHOD AND APPARATUS FOR IMPROVING PERFORMANCE OF ERASURE SEQUENCE DETECTION

(75) Inventors: Sony John Akkarakaran, San Diego, CA (US); Ming-Chang Tsai, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1128 days.

(21) Appl. No.: 11/960,349

(22) Filed: Dec. 19, 2007

(65) Prior Publication Data

US 2009/0161606 A1    Jun. 25, 2009

(51) Int. Cl.
*H04W 4/00* (2009.01)
*H04L 9/32* (2006.01)
*H04W 72/04* (2009.01)

(52) U.S. Cl.
CPC ............ *H04L 9/3247* (2013.01); *H04W 72/04* (2013.01)
USPC ........................................................ 370/329

(58) Field of Classification Search
CPC .............................. H04L 9/3247; H04W 72/04
See application file for complete search history.

(56) References Cited

U.S. PATENT DOCUMENTS

| | | | |
|---|---|---|---|
| 2005/0059407 A1* | 3/2005 | Reed et al. .................... | 455/450 |
| 2006/0034173 A1* | 2/2006 | Teague et al. ................. | 370/235 |
| 2006/0191001 A1* | 8/2006 | Winter ............................ | 726/13 |
| 2006/0205413 A1 | 9/2006 | Teague | |
| 2006/0205414 A1 | 9/2006 | Teague | |
| 2007/0130361 A1* | 6/2007 | Li .................................. | 709/231 |
| 2007/0153774 A1* | 7/2007 | Shay et al. .................... | 370/352 |
| 2007/0189235 A1* | 8/2007 | Chandra et al. ............... | 370/335 |
| 2007/0217370 A1* | 9/2007 | Soong et al. .................. | 370/337 |
| 2007/0218936 A1* | 9/2007 | Waxman et al. .............. | 455/522 |
| 2009/0011711 A1 | 1/2009 | Kawasaki et al. | |
| 2009/0092067 A1* | 4/2009 | Sudarshan et al. ........... | 370/281 |
| 2009/0113066 A1* | 4/2009 | Van Wie et al. .............. | 709/231 |
| 2010/0067508 A1* | 3/2010 | Chol et al. .................... | 370/338 |
| 2010/0232302 A1 | 9/2010 | Fukui | |

FOREIGN PATENT DOCUMENTS

| | | |
|---|---|---|
| CN | 1864417 A | 11/2006 |
| CN | 101023630 | 8/2007 |
| JP | 4950287 | 3/2012 |
| KR | 20040058428 A | 7/2004 |
| WO | WO2005034364 | 4/2005 |
| WO | WO2006020030 | 2/2006 |
| WO | 2007110960 A1 | 10/2007 |
| WO | 2007125702 A1 | 11/2007 |
| WO | WO2007124675 A1 | 11/2007 |

OTHER PUBLICATIONS

International Search Report and Written Opinion—PCT/US2008/087213, International Search Authority—European Patent Office—Feb. 10, 2009.
Taiwan Search Report—TW097149938—TIPO—Jan. 13, 2012.

* cited by examiner

*Primary Examiner* — John Blanton
(74) *Attorney, Agent, or Firm* — Charles E. Eggers

(57) ABSTRACT

Attributes of access terminals are employed in determining durations for erasure sequences. Transmissions from access terminals are analyzed to determine different attributes are based at least on these attributes traffic models are estimated. Those terminals whose traffic models tend towards more frequent occurrences of longer erasures are assigned longer erasure durations to improve performance in erasure sequence detection.

54 Claims, 12 Drawing Sheets

METHOD AND APPARATUS FOR IMPROVING PERFORMANCE OF ERASURE SEQUENCE DETECTION

BACKGROUND

Wireless communication systems are widely deployed to provide various types of communications such as voice, data, video, etc. These systems may be multiple-access systems capable of supporting communication with multiple access terminals by sharing available system resources (e.g., bandwidth, transmit power etc.) Examples of such multiple-access systems include code division multiple access (CDMA) systems, time division multiple access (TDMA) systems, frequency division multiple access (FDMA) systems, orthogonal frequency division multiple access (OFDMA) systems or combinations thereof. Typically, a wireless communication system comprises several base stations, wherein each base station communicates with a mobile station using a forward link and each mobile station (or access terminal) communicates with base station(s) using a reverse link.

When data is generated for transmission by a user, a service request is transmitted via established communication channels from a user equipment/access terminal to a serving base station and based on negotiated service options/availability, resources are assigned to the user. Most modern wireless communication systems have a mix of users carrying different types of traffic flows. This necessitates different mechanisms to assign the physical channel resources (bandwidth, time etc.) to different users. Typically, in a synchronous system with centralized scheduling, the receiver's data is broken into packets which are coded independently, and the receiver's channel assignment lasts at least for the duration of the packet. This duration itself may be fixed or may vary depending on feedback from the receiver. But after this duration, one approach is to keep the assignment until it is explicitly terminated or reassigned to another user—such assignments are called 'sticky'. Another approach is to say that each assignment lasts only for the packet duration—such assignments are called 'non-sticky'.

Therefore, for users who need an assigned communication resource for longer periods of time, sticky assignments make it unnecessary to keep reassigning the resource to them. This potentially reduces their latency as well as reducing the signaling overhead on the control channel that carries the user assignments. Further, it allows the system to support a situation where there are a large number of users, each needing a small bandwidth for a long time period (e.g. voice users), without overloading this control channel. However, it makes it necessary to include in the control channel signaling, ways to inform the owner of termination of a sticky assignment, e.g., either by a reassigning the resource to another user (in which case, the control signal must be heard by both the current and the new user) or by an explicit deassignment message to the current user. Additionally, in order to maintain the usefulness of sticky assignments for the above-mentioned situation with a large number of voice users, it is necessary to allow users to hold sticky assignments even when there is no data to send them. This necessitates a mechanism to let each user know at any given time whether their sticky assignment is carrying data or not. Accordingly, a transmitter sends a known sequence, called an 'erasure sequence', which the receiver will attempt to detect to decide whether or not a frame corresponds to the start of a packet or to an erasure.

However, the erasure sequences have to be detected within a short time period e.g., one frame. Additionally, the erasure detection process cannot obtain gains from H-ARQ (Hybrid Automatic Repeat Request) procedure while coding across multiple frame durations. This makes erasure detection harder than normal packet demodulation.

SUMMARY OF THE INVENTION

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

In accordance with an aspect, a method for transmission that facilitates erasure detection within communication systems is disclosed. The method comprises, receiving one or more communications from an access terminal, and estimating one or more attributes associated with the access terminal from at least the received communications. The duration for erasure sequences is assigned based at least on the estimated attributes. In accordance with further aspects, resources can be assigned to the access terminal, which assignment is conveyed to the terminal via a resource assignment message. The duration of erasure sequence is communicated to the access terminal in the resource assignment message. In accordance with various aspects, the assignment can be a sticky assignment for the access terminal. Another aspect relates to the duration being conveyed to the access terminal within a group assignment message when the terminal is part of a group of access terminals. In accordance with different aspects, the one or more attributes conveyed can pertain to one or more of bandwidth assignment size, the terminal's received signal strength, or the terminal's traffic model. Accordingly, the one or more estimated attributes can be associated with bandwidth size assigned to users/access terminals. Therefore, if the terminal is assigned higher bandwidth, a shorter erasure duration is determined while a longer erasure duration is conveyed if the terminal is associated with lower bandwidth. In another aspect the attributes can be associated with the terminal's received signal strength and the terminal is assigned longer erasure duration if its signal strength is low, while a shorter erasure duration is assigned if it has higher signal strength. In accordance with another aspect, the one or more attributes are associated with a terminal's traffic model. Accordingly, if the terminal is associated with a traffic model with more frequent occurrences of longer erasures, it is assigned a longer erasure duration and if the traffic model has infrequent occurrences of longer erasures, it is assigned a shorter erasure duration. In accordance with yet another aspect, a terminal's burst statistics are monitored by computing a histogram that shows the probabilities of occurrences of bursts of consecutive erasures of different lengths and computing a mean burst length. The mean burst length is employed in determining the erasure duration to be assigned in a manner that does not change the average value of the terminal's latency. In accordance with a further aspect, the access terminal implements MIMO (multiple input multiple output) or SIMO (single input multiple output) schemes for communications such that different QoS flows are assigned different erasure sequence durations. Another aspect relates to monitoring the access terminal for variations in attributes and reassigning erasure sequence durations if the one or more attributes vary beyond a predetermined range.

Another aspect is associated with a system for improving erasure sequence detection. The system comprises a communications component that facilitates information exchange with the access terminals, an estimation component that estimates one or more attributes associated with the access terminals via the communications received from the access terminals; and an assigning component that assigns erasure durations to each of the one or more access terminals based on their respective attributes.

In accordance with another aspect, a processor readable media comprising instructions operable to facilitate erasure detection is disclosed. The instructions facilitate receiving one or more communications from an access terminal, estimating one or more attributes associated with the access terminal and assigning erasure duration based on the estimated attributes.

Another aspect is associated with a system for improving erasure sequence detection. The system comprises a means for communication that facilitates communications with one or more access terminals. The system also comprises a means for processing that estimates one or more attributes associated with the access terminals via the communications received from the access terminals and assigns erasure durations to each of the one or more access terminals based on their respective attributes.

In accordance with another aspect, a method of communication that facilitates erasure detection is disclosed. The method comprises transmitting one or more attributes associated with access terminals, receiving duration for erasure sequences, the duration is determined based on the transmitted one or more attributes, and transmitting data packets alternated with erasure sequences of the received durations. The erasure sequence duration is received in a message conveying information regarding resource assignments to an associated access terminal. In accordance with different aspects, the assignment is a sticky assignment or a group assignment. The method relates to further varying erasure sequence durations based on variations in the one or more attributes. In another aspect, the access terminal can implement one of MIMO or SIMO systems of communication such that data streams with different attributes transmit data packets with erasure sequences of different durations based on respective attributes.

In another aspect, a system for improving erasure sequence detection is disclosed. The system comprises one or more communication component and a processing component associated with an access terminal. The communication components are operable to transmit/receive information. In particular they transmit one or more attributes associated with the access terminal. The processing component receives duration for erasure sequences from an access point, wherein the duration for erasure sequences is determined based on the one or more attributes.

In accordance with yet another aspect, a processor readable medium storing instructions that facilitate erasure detection is disclosed. The instructions are operable for transmitting one or more attributes, receiving duration for erasure sequences, and transmitting data packets alternated with erasure sequences of the received durations. The duration is determined based at least on the transmitted one or more attributes.

Another aspect is associated with a system for improving erasure sequence detection. The system comprises one or more means for communication associated with an access terminal. The means for communication are operable to transmit/receive information. In particular, the communication means transmit one or more attributes associated with the access terminal and receives determined erasure sequence durations. The duration for erasure sequences is determined based at least on the transmitted one or more attributes. The system also comprises a means for processing that generates erasure sequences based on the received duration.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DESCRIPTION OF THE INVENTION

Figure 1:
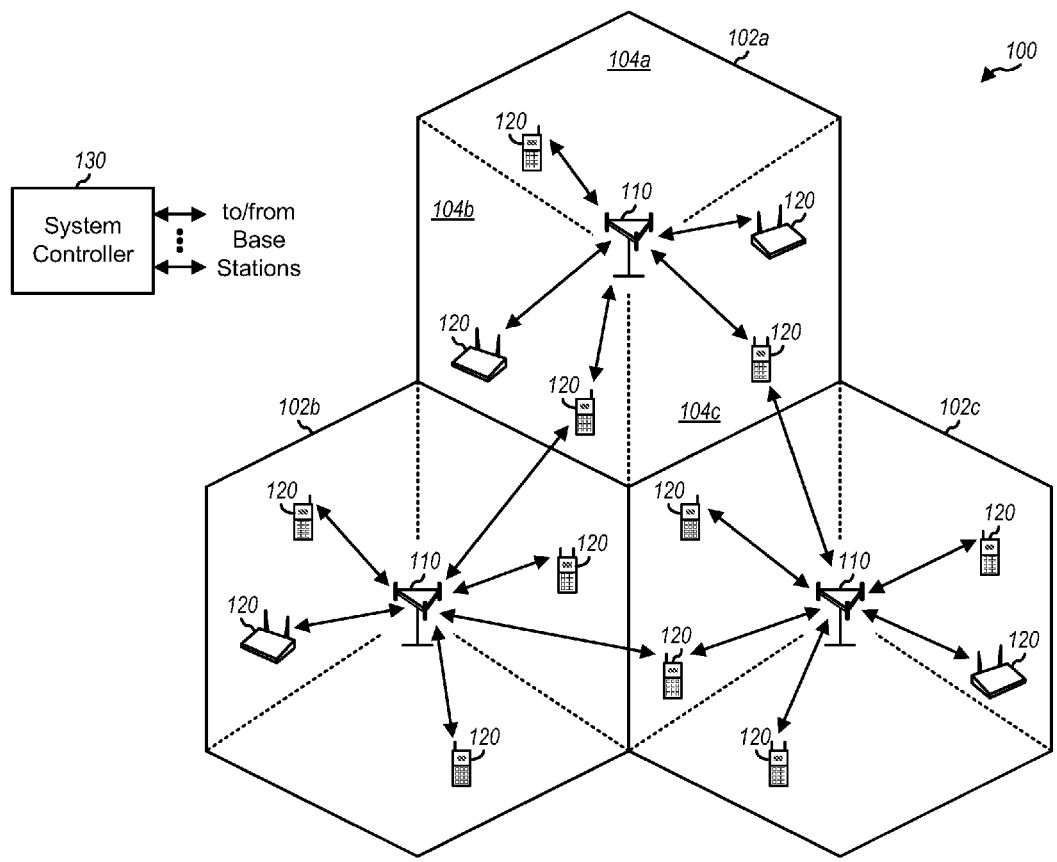
FIG. 1 is an illustration of a wireless multiple-access communication system in accordance with various aspects.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

Various embodiments are now described with reference to the drawings, wherein like reference numerals are used to refer to like elements throughout. In the following description, for purposes of explanation, numerous specific details are set forth in order to provide a thorough understanding of one or more aspects. It may be evident however, that such embodiment(s) may be practiced without these specific details. In other instances, well-known structures and devices are shown in block diagram form in order to facilitate describing one or more embodiments. As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an integrated circuit, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Various embodiments will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The word "exemplary" is used herein to mean "serving as an example, instance, or illustration." Any embodiment or design described herein as "exemplary" is not necessarily to be construed as preferred or advantageous over other embodiments or designs. The word "listening" is used herein to mean that a recipient device (access point or access terminal) is receiving and processing data received on a given channel.

Various aspects can incorporate inference schemes and/or techniques in connection with transitioning communication resources. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events, or decision theoretic, building upon probabilistic inference, and considering display actions of highest expected utility, in the context of uncertainty in user goals and intentions. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, various aspects are described herein in connection with a subscriber station. A subscriber station can also be called a system, a subscriber unit, mobile station, mobile, remote station, access point, remote terminal, access terminal, user terminal, user agent, a user device, mobile device, portable communications device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to the drawings, FIG. 1 is an illustration of a wireless multiple-access communication system 100 in accordance with various aspects. In one example, the wireless multiple-access communication system 100 includes multiple access points (APs) 110 and multiple access terminals (ATs) 120. A base station may also be called, and may contain some or all of the functionality of, an access point, a Node B, and/or some other network entity. Each access point 110 provides communication coverage for a particular geographic area 102. The term "cell" can refer to an access point and/or its coverage area depending on the context in which the term is used. To improve system capacity, an access terminal coverage area may be partitioned into multiple smaller areas, e.g., three smaller areas 104a, 104b, and 104c. Each smaller area is served by a respective base transceiver subsystem (BTS). The term "sector" can refer to an AP and/or its coverage area depending on the context in which the term is used. For a sectorized cell, the APs for all sectors of that cell are typically co-located within the base station for the cell. The signaling transmission techniques described herein may be used for a system with sectorized cells as well as a system with un-sectorized cells. For simplicity, in the following description, the term "base station" is used generically for a station that serves a sector as well as a station that serves a cell.

Terminals 120 are typically dispersed throughout the system, and each terminal may be fixed or mobile. A terminal may also be called, and may contain some or all of the functionality of, a mobile station, a user equipment, and/or some other device. A terminal may be a wireless device, a cellular phone, a personal digital assistant (PDA), a wireless modem card, and so on. A terminal may communicate with zero, one, or multiple base stations on the forward and reverse links at any given moment.

For a centralized architecture, a system controller 130 couples to APs 110 and provides coordination and control for these base stations. System controller 130 may be a single network entity or a collection of network entities. For a distributed architecture, the APs may communicate with one another as needed.

Most modern wireless communication systems have a mix of users carrying different types of traffic flows. This necessitates different mechanisms to assign the physical channel resources (bandwidth and time) to different users. Typically, in a synchronous system with centralized scheduling, the receiver's data is broken into packets which are coded independently, and the receiver's channel assignment lasts at least for the duration of the packet. This duration itself may be fixed or may vary depending on feedback from the receiver.

Resources may generally be assigned in accordance with four methodologies. The first method involves assigning resources in a persistent 'sticky' manner so that the assignments are valid until explicitly terminated or de-assigned. The second method involves non-sticky assignments wherein the resources are assigned in a pre-defined manner with an explicit expiration time, for example, each assignment may last only for the packet duration. The third method involves opportunistically assigning resources to other access terminals during, for example a sticky assignment, when they are not in use by the original "assignee". In accordance with the fourth method, resources are assigned to groups of access terminals wherein a Group Assignment Message in the form of a bit map can be sent to each group, for example, on F-DCH (Forward Data Channel). Although the description infra generally refers to sticky assignments, it can be appreciated that aspects described herein can be applied in various resource assignment methodologies where relevant. For example, when different access terminals associated with a group are assigned to various resources, the Group Assignment Message transmitted to that group can communicate different durations for erasures associated with the different access terminals based on their respective attributes.

Sticky assignments allow the system controller 130, to reduce assignment overhead and the recipient of a given resource to use the assigned resource to perform multiple communications (transmission or reception) without requesting a new assignment for each communication. Using an assignment message, the AP 110 provides resource assignment information, for example a channel identification, to the AT 120. Once, the assignment information is received, the AT 120 transmits actual data on the assigned reverse link channel or receives actual data on the assigned forward link (resource). In a sticky assignment, the assigned channel continues to be assigned to the AT 120. Thus, at various times during the period that a channel is assigned, no actual data may be transmitted or received by the AT 120 or the AP 110. Specifically, in a system with a synchronous frame structure, where a frame is a fixed unit of time and each data packet is transmitted in an integer number of frames, there exists a possibility that a user's assignment during a frame may contain no data. The transmitter must then send a known sequence, called an 'erasure sequence', which the receiver will attempt to detect to decide whether or not a frame corresponds to the start of a packet or to an erasure.

Therefore, an erasure signature packet can be used to fill in the gaps in between data transmissions. The length, the construction and data rate of the erasure signature packet can vary based on available resources. Available resources can be determined by the system controller 130 or the AP that is in communication with the AT. For example, if the receiving entity has the resources to process erasure signature packets having more information bits (for example, 3 bits), the length of erasure signature packet is adjusted to provide more information bits. This may allow the receiving entity to easily determine that the packet received was an erasure signature packet. Also, the power level at which the erasure signature packets are transmitted may vary in order to transmit the erasure sequence at power level low enough that transmission of the erasure sequence does not cause significant interference. Generally, the erasure duration for an AT can be signaled as part of the sticky assignment. The techniques described herein provide for ease of detecting an indication of a gap in transmissions for access terminals.

As used herein, resources or communication resources may refer to a carrier frequency, time slot, an number of tones or subcarriers of an OFDMA system, one or more contiguous blocks of OFDM symbols and subcarriers, e.g. block of 8 symbols by 16 subcarriers, a group of non-contiguous combinations of OFDM symbols and subcarriers, OFDM time-frequency allocations, a logical resource, e.g. a node of a channel tree or a frequency hop sequence, or any other resource.

Figure 2:
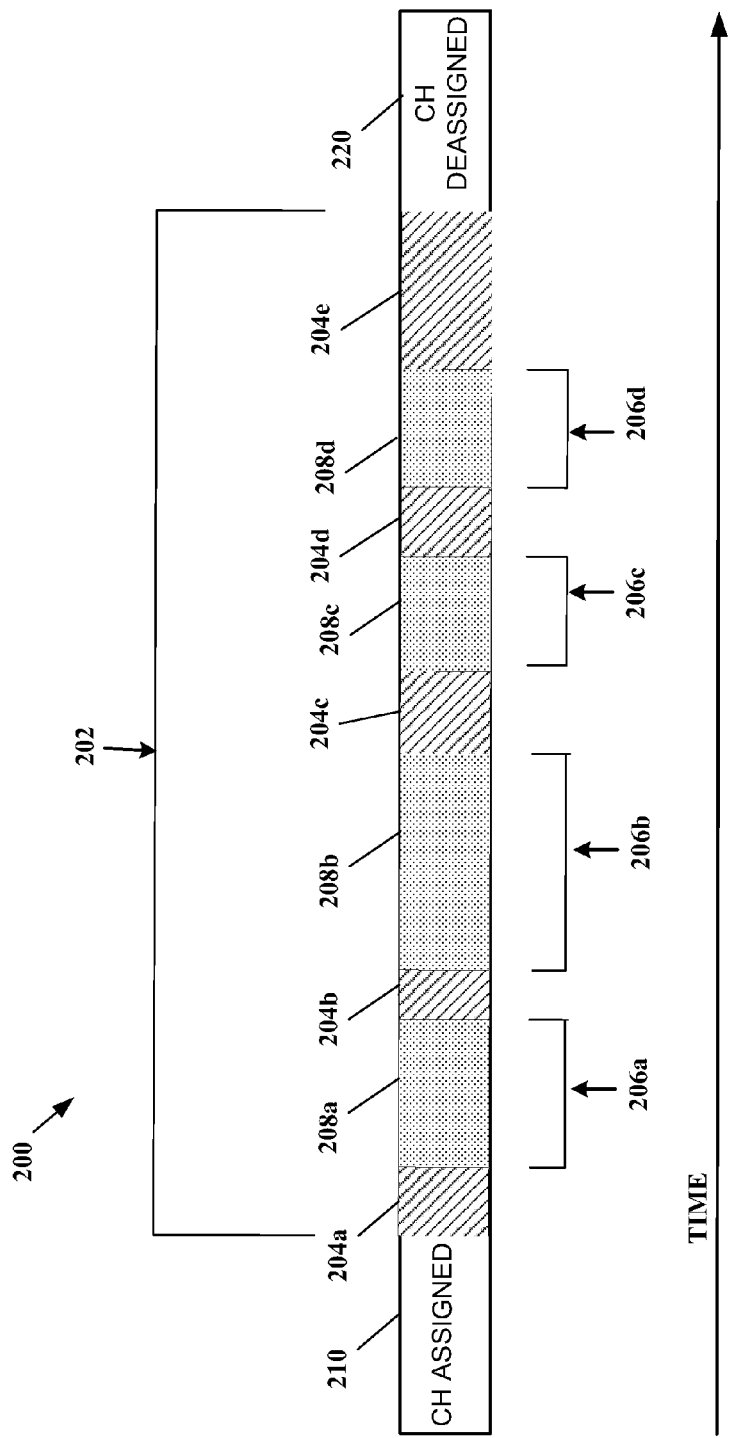
FIG. 2 is an illustration of data traffic on an assigned channel during the use of a sticky assignment in accordance with an aspect.

FIG. 2 is an illustration 200 of data traffic on an assigned channel during the use of a sticky assignment in accordance with an aspect. The sticky assignment duration 202 is generally between an assignment 210 and a deassignment 220 or loss of the session, although it may be for a period of fixed duration including multiple transmissions. During the persistent assignment duration 202, there may be several occurrences of data transmission, for example 204a-204e, wherein data packets are transmitted. Generally, data is not always transmitted continuously for the duration of persistent assignment 202, thus leaving gap portions, for example, 206a-206d. Erasure signature packets 208a-208d that represent that no data transmission is occurring over the resources corresponding to the assignment can be transmitted so that the persistent assignment is not terminated prior to end of the duration 202. The erasure signal may be a fixed erasure signature packet or a message carrying one or more bits representing a unique pattern of data. In other words, the erasure signature packet fills the gap portions 206a-206d with unique patterns and keeps the resources from getting terminated. The erasure signature packet may be a unique identifier that is known to both transmitter and the receiver prior to using the erasure packets. Therefore, it is evident that an erasure sequence has to be detected within a short time period. Further, as detailed infra, erasure detection procedure cannot gain from HARQ procedures.

CDMA systems which implement sticky assignments may be generally characterized by bursty communications wherein the communication channels are populated during data transmission but remain silent at other times. When data is generated for transmission, a processor processes the traffic data into packets/sub-packets of coded data. When a first packet is transported by from a transmitter to a receiver, the receiver generates an acknowledgement (ACK) if the packet is decoded correctly or a negative acknowledgement (NAK) if the packet is decoded in error. Upon receiving the ACK or NAK message, the transmitter transmits a second packet or may repeat the first packet. When the receiver receives the second transmission, it decodes the packet, and sends an ACK or NAK based on the decoding result. The transmitter thus transmits one packet/sub-packet at a time until an ACK is received for a particular packet, all subpackets associated with a particular data packet have been transmitted, or the packet transmission is terminated. While this procedure aids in data transmission, it is not applied to detection of erasure sequences to reduce signaling overhead. Therefore, there is no means by which a transmitter can detect if a particular erasure sequence has been correctly decoded at the receiver. If erasure sequences are not correctly decoded, then data may be decoded as an erasure thereby resulting in loss of information. Various embodiments described herein generally relate to easing the erasure detection process, for example, by supporting variable time-duration for erasure sequences.

Figure 3:
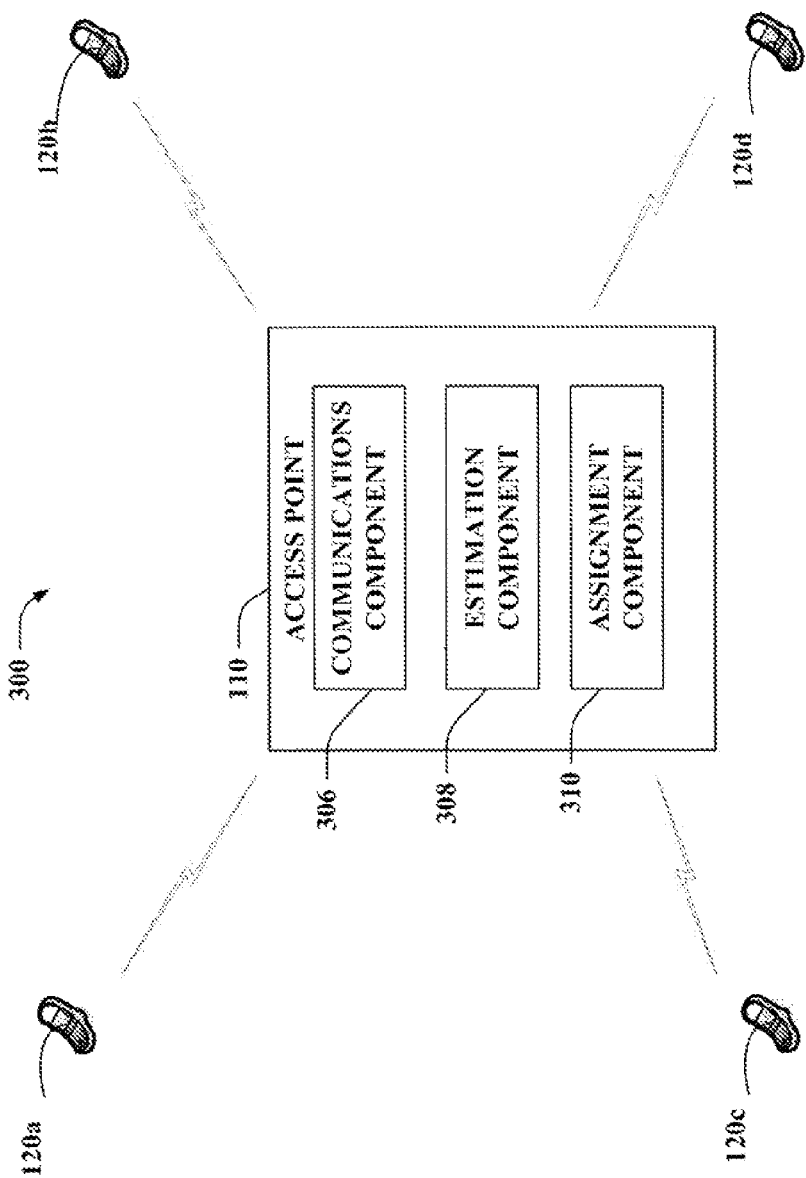
FIG. 3 is a block diagram illustrating a system that effectuates optimal erasure sequence detection in wireless communication systems in accordance with an aspect.

FIG. 3 is an illustration of an example system 300 that effectuates optimal erasure packet detection in wireless communication systems. An access point 110 services a cell comprising one or more access terminals 120a-d. The access point 110 is comprised of a communications component 306 that facilitates receiving from/transmitting to the access terminals, an estimation component that estimates one or more attributes associated with the access terminals via the communications received from them and an assigning component that assigns erasure durations to each of the one or more access terminals based on their respective attributes. Although for ease of understanding, the components are shown as separate entities, it can be appreciated that the functions associated with the components can be carried out by one or more entities comprised within the access point.

Initially when one of the access terminals for example, terminal 120a transmits a request for resources, the transmission is received at the communications component 306. Estimation component 308 analyzes the transmission from the access terminal 120a in order to determine one or more attributes associated with the terminal. The access terminal 120a can provide the access point 110 with information related to its capabilities, an estimate of downlink channel conditions, as well as subscriber data associated with it. This information can be employed by the estimation component 308 to determine the terminal transmission speed, store subscriber data or even information related to capabilities of the transmitting terminal. Thus, in accordance with various aspects, the estimation component 306 can obtain an estimate of one or more of size of bandwidth to be assigned to the terminal, the terminal's signal strength or the traffic model associated with the communications from the terminal. The information derived by the estimation component 308 is then employed by the assigning component 310 to determine assignment of duration for erasure sequences for the access terminal 120a.

As stated supra, the erasure duration for the access terminal 120a can be signaled as part of the sticky assignment, and can depend on any combination of bandwidth assignment size, the terminal's received signal strength (geometry or SNR), and its traffic model. Erasures with longer time-duration waste more system resources and may increase user latency, but are easier to detect. Thus, they can be employed for users who would face difficulty with erasure detection. For example, if the access terminal 120a is associated with a low SNR and/or low bandwidth assignment (which implies low bandwidth for transmitting the erasure) it can be prioritized for being assigned an erasure of longer duration.

Assigning component 310 can thus be employed in connection with making determinations or inferences regarding erasure sequence durations and the like. Assigning component 310 can employ data as currently provided by the estimation component 308 or even stored historical data associated with the access terminal 120a in a probabilistic-based or statistical-based approach, for example, in connection with making determinations or inferences regarding assigning erasure sequence durations to the access terminal as further detailed infra. The inferences can be based in part upon explicit training of classifier(s) (not shown) before employing the assigning component, or implicit training based at least upon previous, or current actions, commands, instructions, and the like during use of the estimation/assigning component 310.

Figure 4:
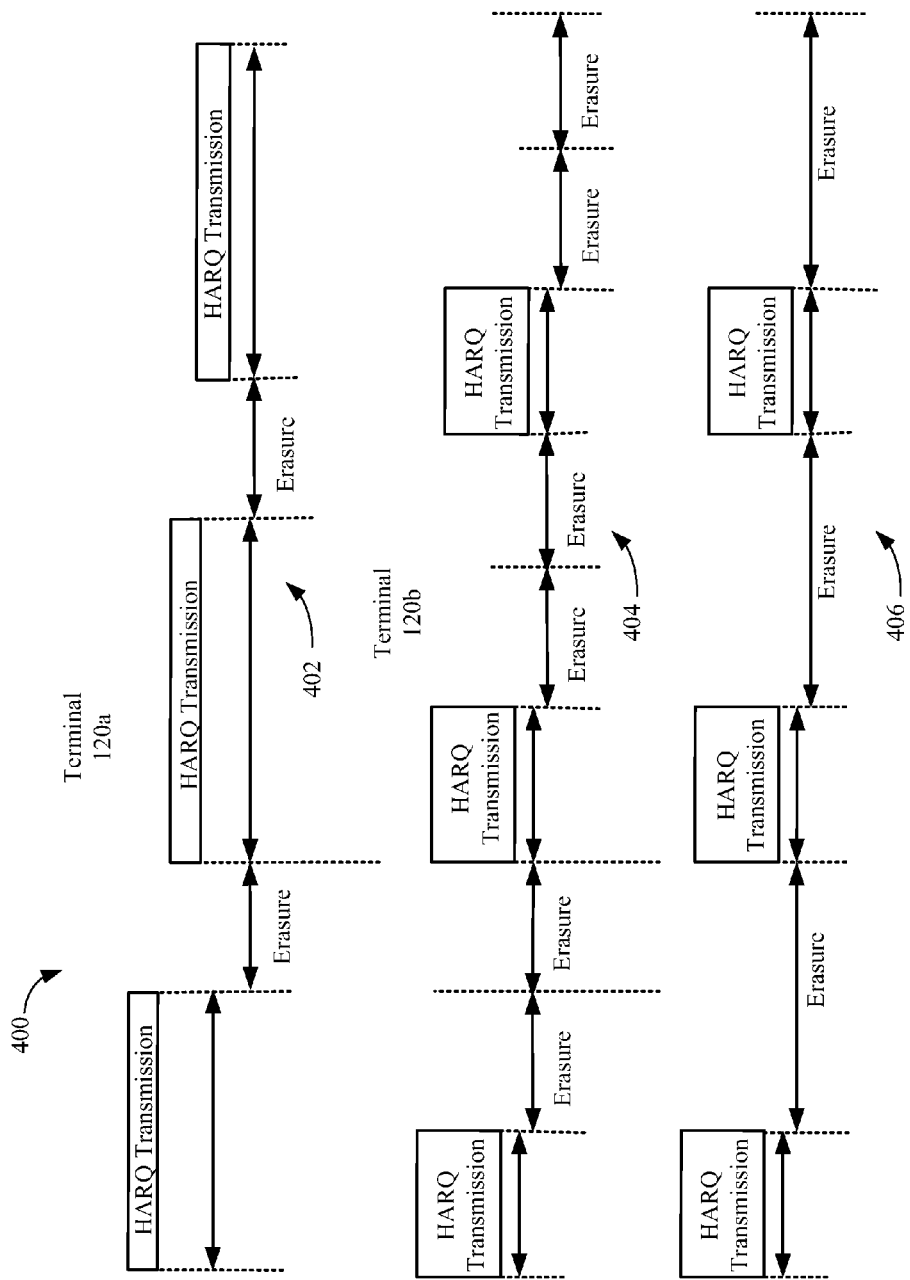
FIG. 4 illustrates a diagram of traffic models associated with different terminals shown in FIG. 3, which models are employed in accordance with an aspect to determine erasure sequence durations for respective terminals.

FIG. 4 illustrates a diagram 400 of traffic models associated with different terminals shown in FIG. 3, which models are employed in accordance with an aspect to determine erasure sequence durations for respective terminals. By the way of illustration, transmission sequences 402 and 404 are associated with access terminals 120a and 120b respectively.

As seen from the figure, the traffic pattern 402 associated with the access terminal 120a shows that it transmits data DCH 1, . . . , DCH N (N≥1) every $T_1$ seconds and hence, it can be concluded that the duration of its erasure sequence is $T_1$ seconds. It can be appreciated that data transmissions or HARQ transmissions can occur with a variable time difference and $T_1$ can be the mean of different durations associated with gaps in transmission of different data packets. Similarly, traffic model associated with access terminal 120b shows data transmissions interspersed with erasure sequences. However, as seen in the figure, 120b has at least two erasures before each data channel transmission DCH. As stated supra, a receiving entity (not shown) communicating with access terminals cannot acknowledge the erasure sequences transmitted and hence the terminals will not be able to detect if the erasure sequences have been correctly decoded at the receiver. In fact, this situation is exacerbated for a receiver communicating with terminal 120b as compared with the receiver associated with terminal 120a. This is because, the receiver communicating with terminal 120b is required to detect two erasures for every data packet that is transmitted, as opposed to, the receiver communicating with terminal 120a which needs to decode only one erasure per data packet. Therefore, in accordance with an aspect, the communication between access terminal 120b and its receiving entity can be eased by implementing a traffic pattern 406 for the terminal 120b.

Accordingly, the access point 110 can signal to the terminal 120b to transmit erasure sequences of $T_2$ duration wherein $T_2=2 T_1$. This eases the communication process as it requires the receiver communicating with access terminal 120b to detect half as many erasure sequences as compared with the traffic pattern 404 since the time duration of each erasure sequence is now doubled. However, since the average time durations for the two erasure sequences in 404 is substantially the same as the single erasure duration in 406, an average value of latency associated with terminal 120b remains substantially unchanged. The ratio of time durations $T_2:T_1$ is used only by way of illustration and not limitation and it can be appreciated that any ratio determined by the assigning component of the access point 110 based on attributes of terminal 120b to ease the communication process can be used. It can also be appreciated that access point 110 can constantly monitor the transmission rate of data packets from an access terminal and dynamically set the erasure sequence durations based on any variations in the rate of data transmissions or other terminal attributes within a particular resource assignment.

In view of exemplary aspects described herein, methodologies that can be implemented in accordance with the disclosed subject matter are discussed. While, for purposes of simplicity, the methodologies are shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement respective methodologies. It is to be appreciated that the functionality associated with various blocks may be implemented by software, hardware, a combination thereof or any other suitable means (e.g., device, system, process component). Additionally, it should be further appreciated that some methodologies disclosed hereinafter and throughout this specification are capable of being stored on an article of manufacture to facilitate transporting and transferring such methodologies to various devices. Those skilled in the art will appreciate and understand that a methodology can alternatively be represented as a series of interrelated states or events such as for example in a state diagram.

Figure 5:
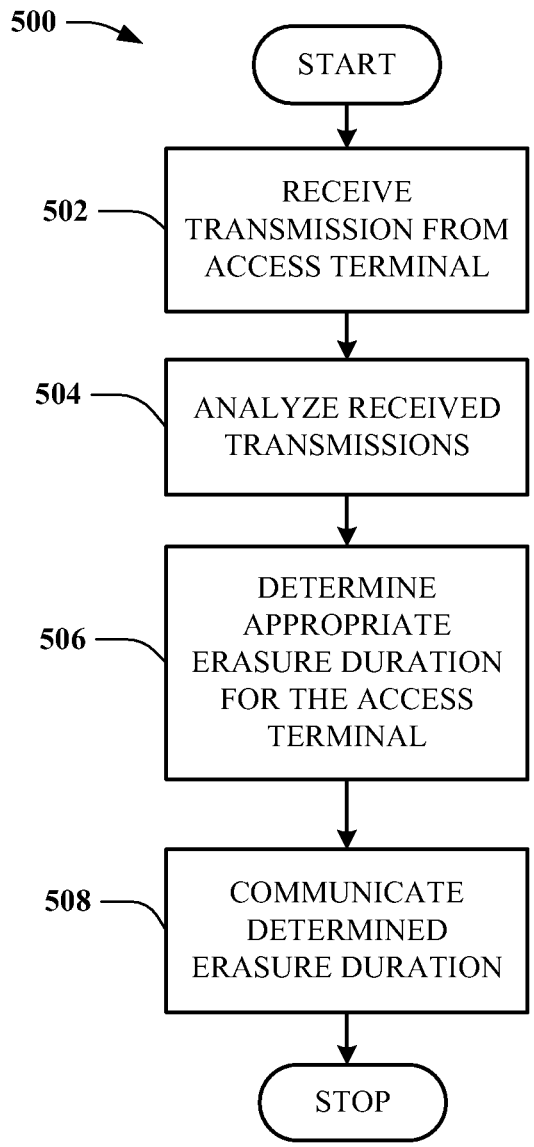
FIG. 5 depicts a methodology of communication for optimal erasure sequence detection in accordance with an aspect.

FIG. 5 depicts a methodology communication in accordance with an aspect. The communication process begins upon an access terminal contacting an access point for assignment of resources. Thus, initially at 502 an access point receives a transmission from the access terminal. In accordance with an aspect, the transmission can be a resource assignment request message. At 504, the transmission is analyzed to derive various attributes associated with the communicating access terminal. In accordance with various aspects, bandwidth assignment size, a terminal's received signal strength (geometry or SNR), and its traffic model can all be estimated at the access point either based on the current transmission alone or via employment of various other factors like historical data/current user data of a user associated with the access terminal, service level options available to the user, QoS considerations etc. At 506, the access point determines appropriate erasure duration for the access terminal based on one or more of the received attributes, historical data etc. By the way of illustration and not limitation, the access point via monitoring current transmissions or based on available historical data, can build a histogram that shows the probabilities of occurrences of bursts of consecutive erasures of different lengths. A mean burst length is calculated and appropriate erasure duration can be assigned, thereby easing the communication process while optimizing resource usage. For example, if the mean burst length is two frames, then on average the latency associated with the transmitting terminal would not have changed had the assignment been one with erasure duration of two frames. Therefore, such users can be given longer erasure durations, to ease the erasure detection problem. Generally, erasures with longer time-duration waste more system resources and may increase user latency, but are easier to detect. Thus, contrary to the general teachings in the art that require minimizing latency and resource usage within communication systems, various aspects of the process can increase the erasure duration for users based on factors described supra, thereby unexpectedly easing problems associated with erasure detection procedures. Finally, the determined erasure duration is then communicated to the access terminal at 508. In accordance with an aspect, the erasure sequence duration is communicated to the access terminal along with a resource assignment message at the beginning of a sticky assignment.

Figure 6:
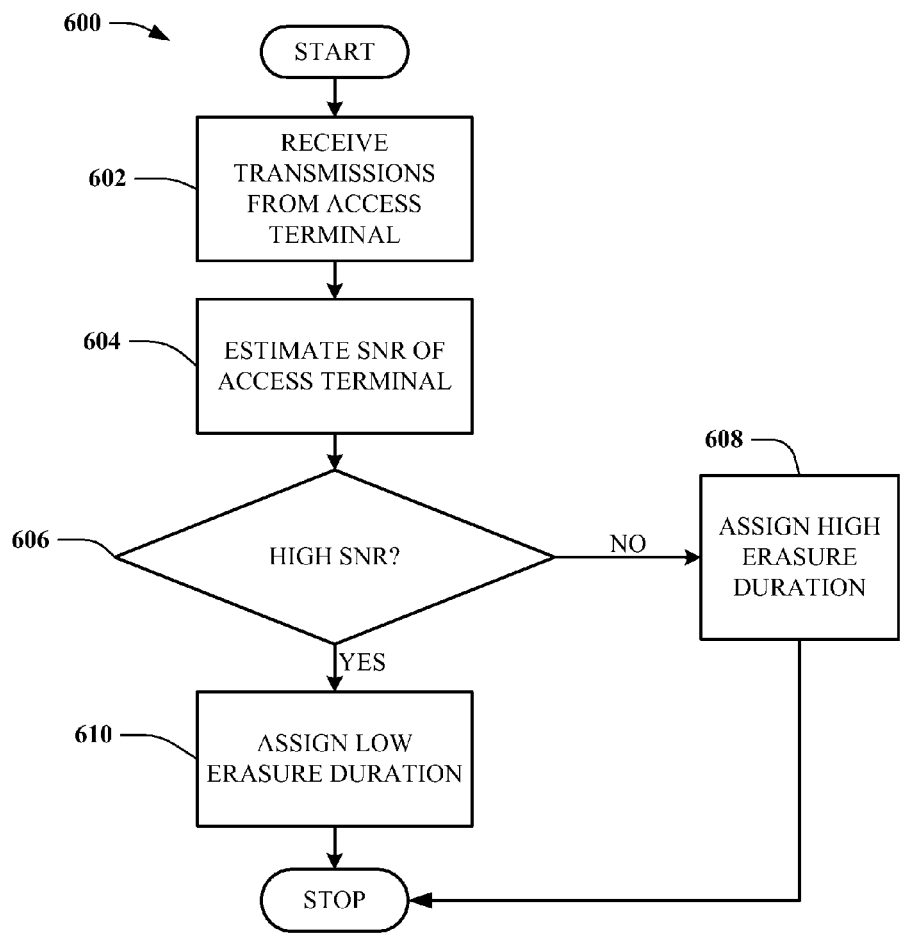
FIG. 6 depicts a methodology of communication that eases erasure detection procedures in accordance with an aspect by employing SNR (Signal to Noise Ratio) associated with a communicating access terminal.

FIG. 6 depicts a methodology of communication 600 that eases erasure detection procedures by employing SNR (Signal to Noise Ratio) associated with a communicating access terminal. The process initially begins at 602 wherein communications from the access terminal are received at a serving base station/access point. At 604, the SNR associated with the access terminal is estimated at the access point. The SNR of users/access terminals may differ due to various reasons, for example, distance of the user/access terminal from the serving access point. At 606, it is determined if the access terminal is associated with a high SNR. If yes, then it can be concluded at 608 that the access terminal has good signal strength and therefore erasure sequence of lower duration is assigned to conserve system resources and maintain low user latency as show at 610. If however, at 606 it is determined that the access terminal is associated with low SNR, then the access terminal is assigned a higher erasure duration as shown at 608. Although, longer erasure durations are resource intensive and increase latency, they are easier to detect. Additionally, an access terminal with low SNR would likely have longer erasures. Therefore, in accordance with this aspect, assigning longer durations for erasure sequences at the start of a sticky assignment, while being contrary to the general teachings of the art, can still ease the erasure detection problem.

Figure 7:
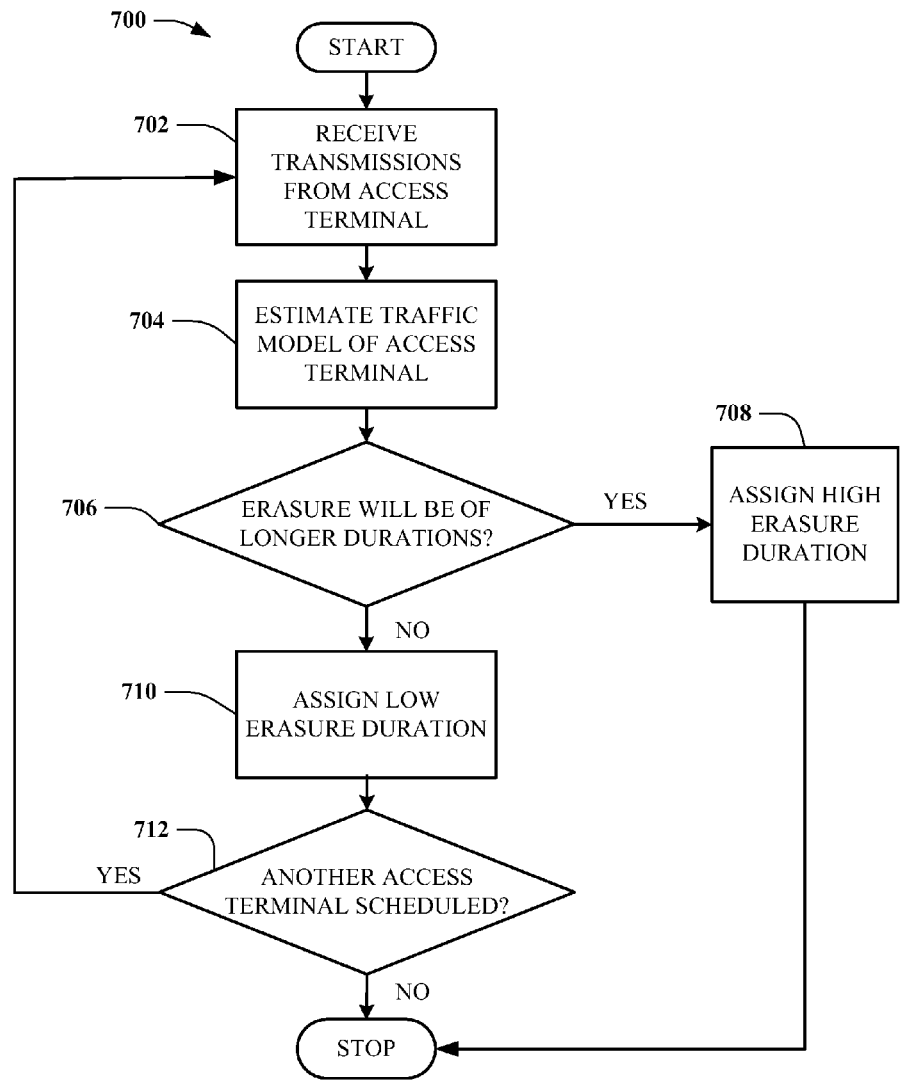
FIG. 7 relates to another aspect wherein a methodology related to determining erasure durations based on the traffic model associated with access terminals is disclosed.

FIG. 7 relates to another aspect wherein a methodology 700 related to determining erasure durations based on the traffic model associated with access terminals. Initially at 702, transmissions from an access terminal are received at the access point. At 704, the traffic model for the access terminal is estimated at the access point. The traffic model is then analyzed to determine if the access terminal will have longer erasure durations as shown at 706. If yes, then the access terminal will be assigned erasure sequence of longer duration as shown at 708 to ease erasure detection process even if it may increase latency and use more resources. On the contrary, if it is estimated that the access terminal will have erasures of shorter duration, then it will assigned an erasure of shorter duration as shown at 710. At 712, it is determined if there is another access terminal to which erasure duration needs to be assigned. If yes, the process returns to 702 else, it concludes at the stop block. Although, assigning erasure sequence durations for various access terminals is shown sequentially, it can be appreciated that variable erasure durations can be assigned simultaneously (or in parallel) to a number of access terminals by a serving access point.

Figure 8:
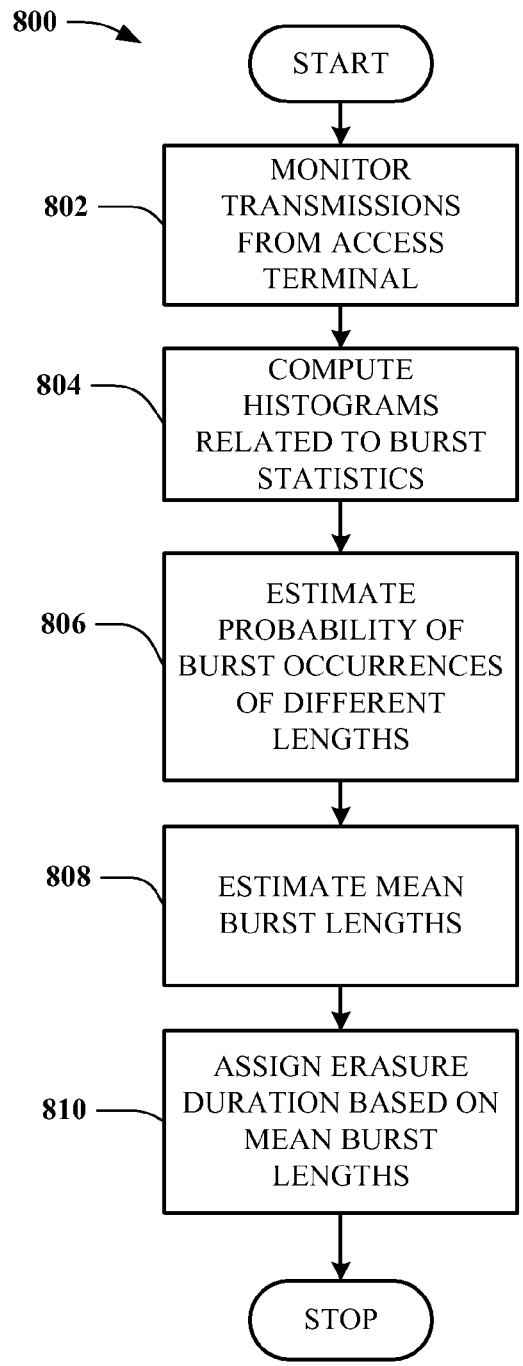
FIG. 8 relates to yet another aspect wherein a method of employing statistical/probabilistic procedures in assigning erasure durations to access terminals is disclosed.

FIG. 8 relates to yet another aspect wherein a method 800 of employing statistical/probabilistic procedures in assigning erasure durations to access terminals is disclosed. In accordance with certain aspects users' historical data, user profile details like associated service options etc. can all be employed to determine erasure durations that may be assigned. Initially at 802 an access point monitors transmissions from access terminals to record various statistics, for example their respective traffic patterns etc. At 804, histograms related to each user's burst statistics are computed. For example, the traffic patterns can be monitored to plot the time Vs data bursts for different users. At 806, the histograms are employed to estimate probability of burst occurrences of different lengths for different users. Any one of numerous methodologies for learning from data and then drawing inferences from the models so constructed (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) can be employed to plot burst statistics and estimate likelihood of burst occurrences of different lengths. At 808, the statistics so obtained are employed to estimate means burst lengths for different users and accordingly, erasure durations are assigned to each of the users' based on their respective mean burst lengths as shown at 810.

Figure 9:
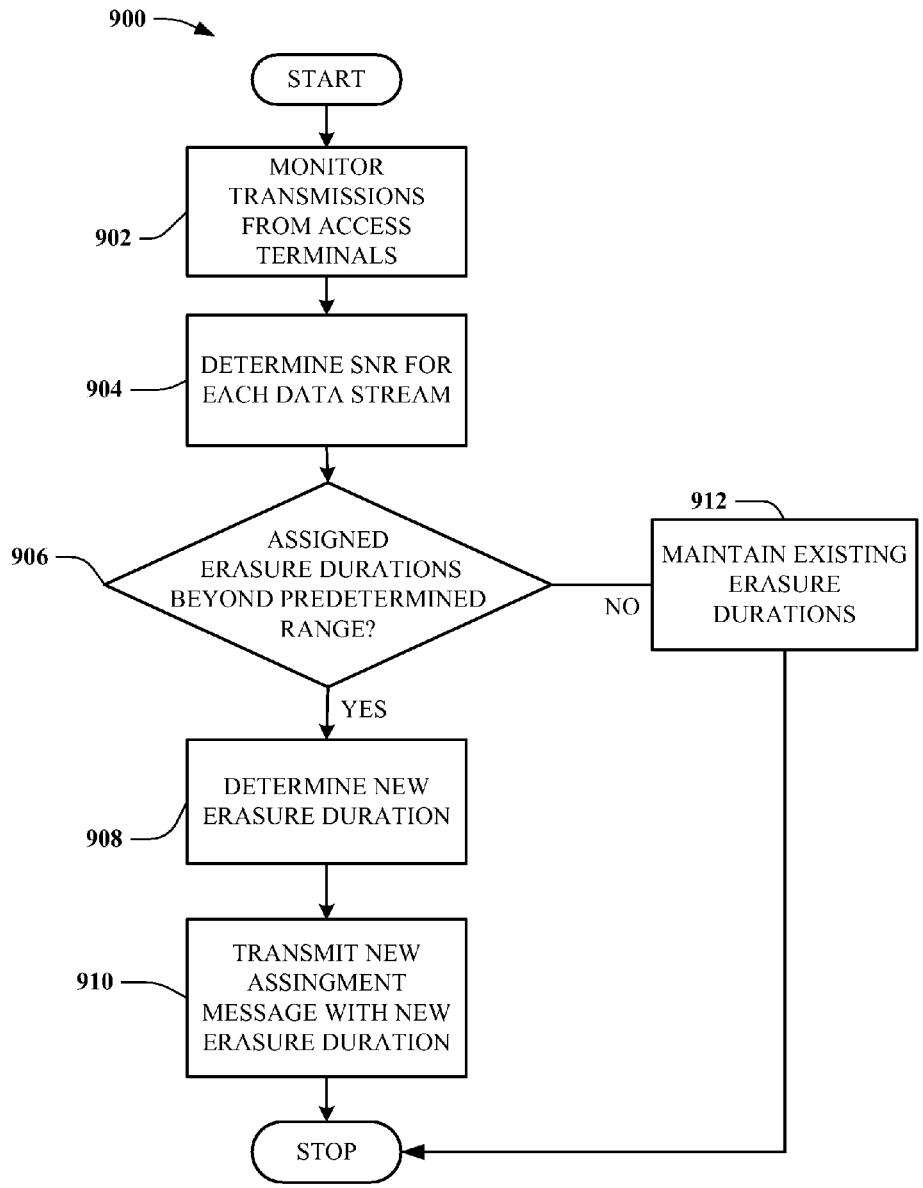
FIG. 9 is associated with a methodology of dynamically assigning erasure durations to access terminals based on variations in traffic patterns.

FIG. 9 is associated with a methodology 900 of dynamically assigning erasure durations to access terminals based on variations in traffic patterns. Conditions associated with mobile access terminals can vary significantly. For example, there can be significant variations in SNR associated with an access terminal as it traverses across a cell associated with an access point. Accordingly, this aspect is associated with monitoring variations in different conditions associated with an access terminal and dynamically adjusting erasure sequence durations accordingly. The procedure beings at 902 wherein transmissions from an access terminal are monitored. In accordance with various aspects the access terminal can be monitored based on historical data or current context information, for example, if the quality of communications is currently low. At 904, the traffic pattern associated with each access terminal is plotted in order to recognize any significant changes in the traffic flow of the access terminal. At 906, previously assigned erasure durations are compared with predetermined ranges to determine if there is variation beyond the range. If the erasure sequence durations vary beyond the range, a new duration is determined for the erasure sequences of such terminals as shown at 908 and a new assignment message is generated for the access terminal comprising the changed value of erasure sequence duration as shown at 910. If it is determined at 906 that there is no significant variation in traffic patterns/erasure durations, the current values are maintained as shown at 912 and the process concludes at the stop block.

Figure 10:
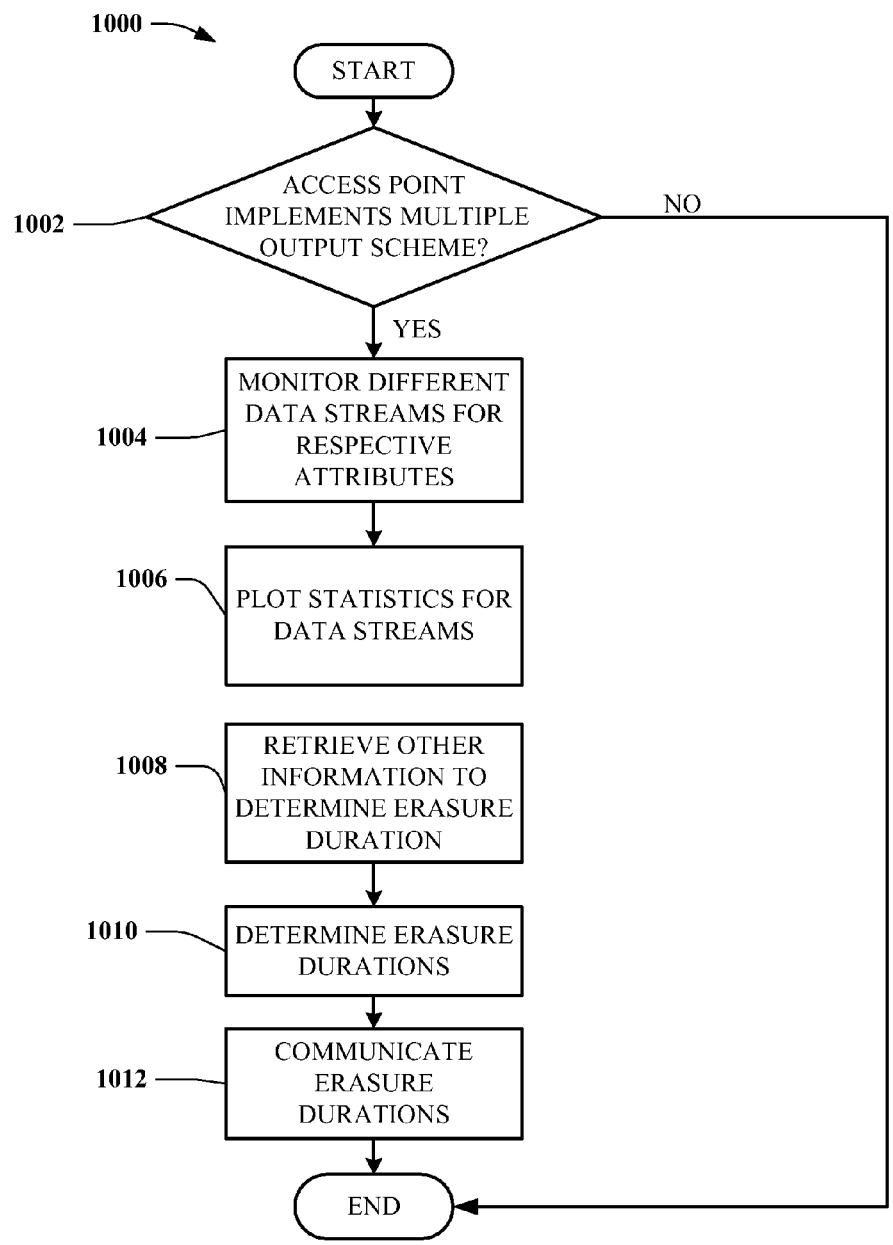
FIG. 10 is another aspect is associated with optimizing erasure sequence durations in MIMO/SIMO systems.

Another aspect illustrated in FIG. 10 is associated with optimizing erasure sequence durations in MIMO/SIMO systems. MIMO (multiple input, multiple output) is an antenna technology for wireless communications in which multiple antennas are used at both the source (transmitter) and the destination (receiver). The antennas at each end of the communications circuit are combined to minimize errors and optimize data speed. MIMO is one of several forms of smart antenna technology, the others being MISO (multiple input, single output) and SIMO (single input, multiple output). Within MIMO/SIMO systems an access terminal can transmit different data streams with different attributes like QoS considerations, traffic patterns etc. which would require a serving access point to optimize assignments to the different data streams. Accordingly, a method 1000 is disclosed wherein at 1002 it is determined if an access terminal is implementing a multiple output scheme (MIMO/SIMO). If it is not implementing a multiple output scheme, the process ends at the stop block else it proceeds to 1004 wherein the different data streams transmitted by the access terminal are monitored for respective attributes. At 1006, statistics are plotted for each data stream in accordance with current context information and/or historical data. At 1008 other information such as user profile etc. can be retrieved in order to make a determination regarding the duration of erasure sequences. At 1010, erasure sequence durations are determined for each of the data streams associated with the access terminal and these durations are communicated to the access terminal as shown at 1012. Thus, various aspects can optimize transmissions based on trade offs between increasing user latency/usage of system resources and easing erasure sequence detection.

Figure 11:
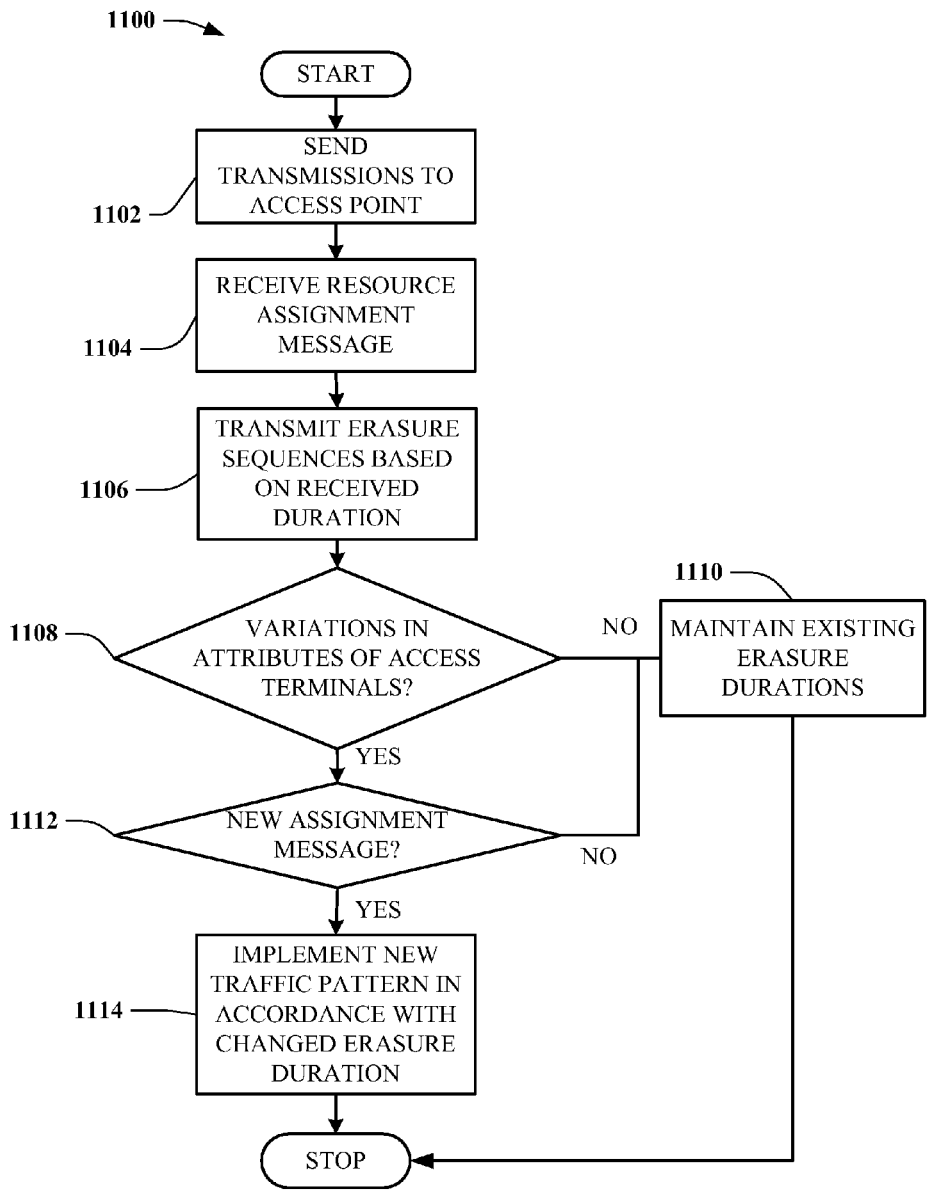
FIG. 11 relates to a methodology associated with an access terminal that can advantageously transmit erasure sequences of variable durations to ease the process of detecting erasures.

FIG. 11 is a methodology 1100 relating to an access terminal that can advantageously transmit erasure sequences of variable durations ease the process of detecting erasures. At 1102, one or more transmissions are sent to a serving access point. For example, the transmissions can be related to messages requesting assignment of resources for conducting communications. At 1104, an assignment message is received from the access point assigning resources to the access terminal with information regarding the type of assignment as well as the duration to be used for erasure sequences. In accordance with different aspects, the assignment message can convey a sticky assignment which assigns resources to the access terminal for a predetermined time period. At 1106, data is transmitted with HARQ transmissions interspersed with erasure sequences in accordance with the duration set in the initial sticky assignment message. At 1108, it is determined if there are variations in attributes of the access terminal. If there are no variations in attributes, the access terminal continues transmissions in accordance with previously set erasure durations as shown at 1110. If there are variations, it is again determined if there is a new assignment message from the access point as shown at 1112. If there is a new assignment message, the erasure duration is changed and a new traffic pattern is implemented as shown at 1114 else, the access terminal continues transmissions in accordance with previously set erasure durations as shown at 1110.

Figure 12:
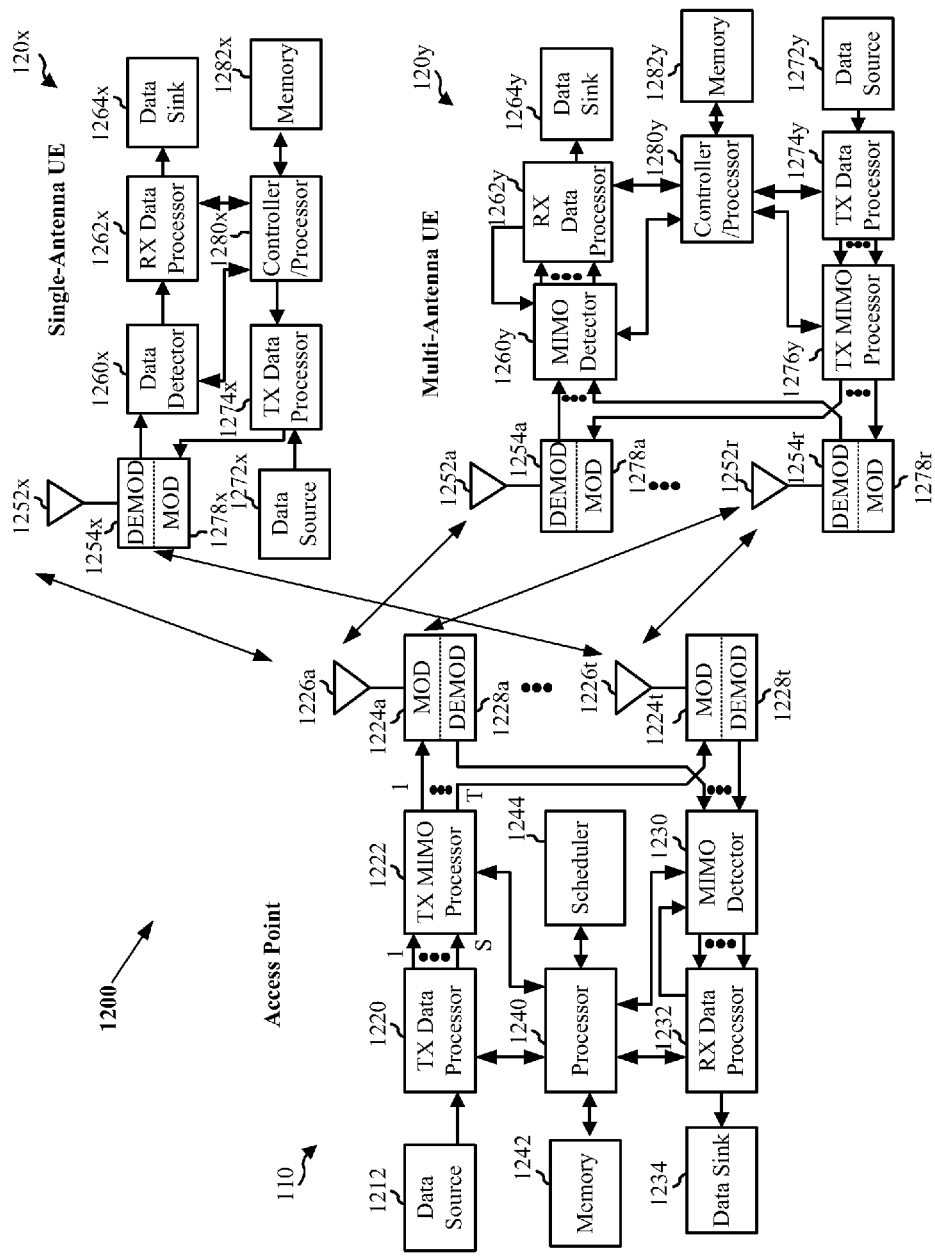
FIG. 12 shows a block diagram of one Node B/access point (AP) and two UEs/access terminals in a wireless communication system.

FIG. 12 shows a block diagram 1200 of one Node B/access point (AP) 110 and two UEs/access terminals 120x and 120y in system 100 of FIG. 1. Access point 110 is equipped with multiple (T>1) antennas 1226a through 1226t. UE 120x is equipped with a single (R=1) antenna 1252x. UE 120y is equipped with multiple (R>1) antennas 1252a through 1252r. Each antenna may be a physical antenna or an antenna array.

At AP 110, a transmit (TX) data processor 1220 receives traffic data for the UEs being served from a data source 1212 and signaling from a controller/processor 1240. TX Processor 1220 processes (e.g., formats, encodes, interleaves, and symbol maps) the traffic data and signaling and generates data symbols. TX Processor 1220 also generates and multiplexes pilot symbols with the data symbols. As used herein, a data symbol is a symbol for data or signaling, a pilot symbol is a symbol for pilot, and a symbol is typically a complex value. The data symbols and pilot symbols may be modulation symbols from a modulation scheme such as PSK (Phase-shift-keying) or QAM (Quadrature Amplitude Modulation). Pilot symbols may also be generated in other manners. Pilot is data that is known a priori by both the AP and the UEs.

A TX MIMO processor 1222 performs transmitter spatial processing on the data and pilot symbols. Processor 1222 may perform direct MIMO mapping, preceding, beamforming, etc. A data symbol may be sent from one antenna for direct MIMO mapping or from multiple antennas for preceding and beamforming. Processor 1222 provides T output symbol streams to T modulators (MODs) 1224a through 1224t. Each modulator 1224 performs modulation (e.g., for OFDM, LFDM, etc.) on its output symbols to obtain output samples. Each modulator 1224 further processes (e.g., converts to analog, filters, amplifies, and upconverts) its output samples and generates a downlink signal. T downlink signals from modulators 1224a through 1224t are transmitted from T antennas 1226a through 1226t, respectively.

At each UE 120, one or multiple antennas 1252 receive the downlink signals from AP 110. Each antenna 1252 provides a received signal to a respective demodulator (DEMOD) 1254. Each demodulator 1254 processes (e.g., filters, amplifies, downconverts, and digitizes) its received signal to obtain received samples. Each demodulator 1254 further performs demodulation (e.g., for OFDM, LFDM, etc.) on the received samples to obtain received symbols.

At single-antenna UE 120x, a data detector 1260x performs data detection (e.g., matched filtering or equalization) on the received symbols and provides data symbol estimates. A receive (RX) data processor 1262x then processes (e.g., symbol demaps, deinterleaves, and decodes) the data symbol estimates and provides decoded data to a data sink 1264x and signaling to a controller/processor 1280x. At multi-antenna UE 120y, a MIMO detector 1260y performs MIMO detection on the received symbols and provides data symbol estimates. An RX data processor 1262y then processes the data symbol estimates and provides decoded data to a data sink 1264y and signaling to a controller/processor 1280y.

UEs 120x and 120y may transmit traffic data, signaling and/or pilot on the uplink to AP 110. The signaling may include feedback information used for data transmission on the downlink. The feedback information may include, e.g., a precoding matrix selected from a set of precoding matrices, one or more columns of the selected precoding matrix, an SNR estimate or a rate for each data stream, etc. The AP may use the feedback information to schedule and transmit data to the UEs.

At each UE 120, traffic data from a data source 1272 and signaling from controller/processor 1280 are processed by a TX data processor 1274, further processed by a TX MIMO processor 1276 (if applicable), modulated (e.g., for OFDM, LFDM, etc.) and conditioned by one or more modulators 1278, and transmitted via one or more antennas 1252. At AP 110, the uplink signals from UEs 120x and 120y are received by antennas 1226a through 1226t, processed (e.g., for OFDM, LFDM, etc.) by demodulators 1228a through 1228t, and further processed by a MIMO detector 1230 and an RX data processor 1232 to recover the traffic data and signaling sent by the UEs. The recovered data is then provided to a data sink 1234.

Controllers/processors 1240, 1280x and 1280y may control the operation of various processing units at AP 110 and UEs 120x and 120y, respectively. Memories 1242, 1282s and 1282y store data and program codes for AP 110 and UEs 120x and 120y, respectively. A scheduler 1244 schedules UEs for downlink and/or uplink transmission, e.g., based on feedback information received from the UEs.

The techniques described herein may be implemented by various means. For example, these techniques may be implemented in hardware, firmware, software, or a combination thereof. For a hardware implementation, the processing units at a UE or a Node B may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the techniques may be implemented with modules (e.g., procedures, functions, and so on) that perform the functions described herein. The firmware and/or software codes may be stored in a memory and executed by a processor. The memory may be implemented within the processor or external to the processor.

The previous description of the disclosed embodiments is provided to enable any person skilled in the art to make or use the disclosure. Various modifications to these embodiments will be readily apparent to those skilled in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A method of transmission that facilitates erasure detection, comprising:
    receiving, at an access point, one or more communications from an access terminal;
    estimating, from the one or more communications, one or more attributes associated with the access terminal, wherein the one or more attributes relate to one or both of a size of bandwidth to be assigned to the access terminal and a traffic model of the access terminal;
    assigning an erasure sequence duration for one or more erasure sequences based at least on the one or more attributes, wherein each of the one or more erasure sequences comprises a packet added to a frame by the access terminal for filling in a gap in the frame between data transmissions when the gap is detected by the access terminal, and wherein the packet comprises an identifier known to both the access terminal and the access point; and
    communicating the erasure sequence duration to the access terminal in a message assigning resources to the access terminal, wherein no data transmissions occur with the access terminal during the erasure sequence duration.

2. The method of claim 1, wherein the message assigning resources comprises a sticky assignment.

3. The method of claim 1, wherein the one or more attributes are associated with the bandwidth size to be assigned to the access terminal, and wherein a shorter erasure sequence duration is assigned when the access terminal is associated with a higher bandwidth and a longer erasure sequence duration is assigned when the access terminal is associated with a lower bandwidth.

4. The method of claim 1, wherein the one or more attributes are further associated with a received signal strength of the access terminal, and wherein a shorter erasure sequence duration is assigned when the access terminal has a higher signal strength and a longer erasure sequence duration is assigned when the access terminal has a lower signal strength.

5. The method of claim 1, wherein the one or more attributes are associated with the traffic model of the access terminal, and wherein the access terminal is assigned a longer erasure sequence duration when the access terminal is associated with a traffic model of the access terminal having more frequent occurrences of longer erasures and the access terminal is assigned a shorter erasure sequence duration when the access terminal is associated with a traffic model of the access terminal having infrequent occurrences of longer erasures.

6. The method of claim 1, further comprising monitoring burst statistics of the access terminal to determine the appropriate erasure sequence duration for assignment.

7. The method of claim 6, wherein the monitoring burst statistics further comprises:
computing a histogram that provides probabilities of occurrences of bursts of consecutive erasures of different lengths; and
computing a mean burst length based at least in part on the histogram.

8. The method of claim 6, further comprising:
assigning the erasure sequence duration such that an average value a latency of the access terminal due to the assigned erasure sequence duration remains constant.

9. The method of claim 1, further comprising monitoring one or more QoS (quality of service) flows of the access terminal to determine the appropriate erasure sequence duration for assignment.

10. The method of claim 9, wherein the monitoring one or more QoS flows further comprises monitoring a plurality of QoS flows associated with the access terminal implementing MIMO (multiple input multiple output) or SIMO (single input multiple output) communications such that different QoS flows are assigned different erasure sequence durations.

11. The method of claim 1, further comprising monitoring the access terminal for variations in the one or more attributes and reassigning the erasure sequence duration when the one or more attributes vary beyond a predetermined range.

12. An apparatus for erasure sequence detection, comprising:
a communications component, comprising hardware, that facilitates information exchange between an access point and one or more access terminals;
an estimation component, comprising hardware, that estimates one or more attributes associated with the one or more access terminals via the communications received from the one or more access terminals, wherein the one or more attributes for each of the one or more access terminals relate to one or both of a size of bandwidth to be assigned to the access terminal and a traffic model of the access terminal; and
an assigning component, comprising hardware, that assigns an erasure sequence duration for one or more erasure sequences to each of the one or more access terminals based on their respective one or more attributes, wherein each of the one or more erasure sequences comprises a packet added to a frame by the access terminal for filling in a gap in the frame between data transmissions when the gap is detected by the access terminal, and wherein the packet comprises an identifier known to both the access terminal and the access point,
wherein the communications component transmits a resource assignment message to at least one of the one or more access terminals, wherein the resource assignment message comprises the assigned erasure sequence durations for each of the one or more access terminals, and wherein no data transmissions occur with the one or more access terminals during the erasure sequence duration.

13. The apparatus of claim 12, wherein information received from the one or more access terminals relates to one or more of respective capabilities, estimates of respective downlink channel conditions, and subscriber data associated with each of the access terminals.

14. The apparatus of claim 12, wherein the resource assignment message comprises a sticky assignment.

15. The apparatus of claim 14, wherein the resource assignment message is a group assignment message transmitted to a group comprising at least one of the one or more access terminals and the resource assignment message conveys information regarding resources assigned to the group.

16. The apparatus of claim 12, wherein the assigning component further employs current context data obtained from received transmissions or historical data associated with users employing the one or more access terminals to determine durations of erasure sequences.

17. The apparatus of claim 12, wherein at least one of the one or more access terminals comprises a plurality of antennas that implement at least one of MIMO (multiple input multiple output) and SIMO (single input multiple output) schemes for communications.

18. The apparatus of claim 17, wherein the at least one access terminal implementing one of MIMO and SIMO schemes transmits a plurality of data streams from the plurality of antennas, and wherein the plurality of data streams are associated with different QoS (quality of service) parameters.

19. The apparatus of claim 18, wherein the assigning component assigns different values of erasure sequence durations to each of the plurality of data streams that have been assigned resources in sticky assignments.

20. The apparatus of claim 12, wherein the estimation component tracks variations in the one or more attributes of the one or more access terminals and the assigning component varies erasure sequence durations to the one or more access terminals based on respective variations in the one or more attributes.

21. A non-transitory processor readable medium comprising:
instructions for causing a processor to receive, at an access point, one or more communications from an access terminal;
instructions for causing the processor to estimate, from the one or more communications, one or more attributes associated with the access terminal, wherein the one or more attributes relate to one or both of a size of bandwidth to be assigned to the access terminal and a traffic model of the access terminal;
instructions for causing the processor to assign an erasure sequence duration for one or more erasure sequences based on the estimated attributes, wherein each of the one or more erasure sequences corresponds to a packet added to a frame by the access terminal for filling in a gap in the frame between data transmissions when the gap is detected by the access terminal, and wherein the packet comprises an identifier known to both the access terminal and the access point; and
instructions for causing the processor to communicate the assigned erasure sequence duration to the access terminal in a message assigning resources to the access terminal, and wherein no data transmissions occur with the access terminal during the erasure sequence duration.

22. The processor readable medium of claim 21, further comprising instructions for causing the processor to assign the resources to the access terminal for a predetermined period.

23. The processor readable medium of claim 21, wherein the one or more estimated attributes are associated with the bandwidth size to be assigned to the access terminal, and wherein the erasure sequence duration is assigned so that when the access terminal has a higher bandwidth, a shorter erasure sequence duration is assigned to the access terminal, and when the access terminal is associated with a lower bandwidth, a longer erasure sequence duration is assigned to the access terminal.

24. The processor readable medium of claim 21, wherein the one or more attributes are further associated with an received signal strength of the access terminal, and wherein the access terminal is assigned a shorter erasure sequence duration when the access terminal has a higher signal strength and the access terminal is assigned a longer erasure sequence duration when the access terminal has a lower signal strength.

25. The processor readable medium of claim 21, wherein the one or more attributes are associated with the traffic model of the access terminal, and wherein the access terminal is assigned a longer erasure sequence duration when the traffic model of the access terminal is associated with more frequent occurrences of longer erasures, and the access terminal is assigned a shorter erasure sequence duration when the traffic model of the access terminal is associated with infrequent occurrences of longer erasures.

26. The processor readable medium of claim 21, further comprising instructions for causing the processor to monitor burst statistics of a user to determine the appropriate erasure sequence duration for assignment.

27. The processor readable medium of claim 26, wherein the monitoring burst statistics comprise:
  computing a histogram that provides the probabilities of occurrences of bursts of consecutive erasures of different lengths; and
  computing a mean burst length based at least in part on the histogram.

28. The processor readable medium of claim 26, further comprising instructions for causing a processor to assign the erasure sequence duration such that there is no change in an average value of a latency of the access terminal due to the assigned erasure sequence duration.

29. The processor readable medium of claim 21, further comprising instructions for causing a processor to monitor one or more QoS (quality of service) flows of the access terminal to determine appropriate erasure sequence duration for assignment.

30. The processor readable medium of claim 29, wherein the monitoring one or more QoS flows comprises monitoring a plurality of QoS flows associated with the access terminal implementing MIMO (multiple input multiple output) or SIMO (single input multiple output) communications such that different QoS flows are assigned different erasure sequence durations.

31. The processor readable medium of claim 21, further comprising instructions for causing a processor to monitor the access terminal for variations in the one or more attributes and reassigning the erasure sequence duration when the one or more attributes vary beyond a predetermined range.

32. An apparatus for erasure sequence detection, comprising:
  means for communicating, at an access point, with one or more access terminals; and
  means for estimating one or more attributes associated with the one or more access terminals via the communications received from the one or more access terminals, wherein the one or more attributes for each of the one or more access terminals relate to one or both of a size of bandwidth to be assigned to the terminal and a traffic model of the access terminal; and
  means for assigning erasure sequence durations for one or more erasure sequences to each of the one or more access terminals based on their respective attributes, wherein each of the one or more erasure sequences comprise a packet added to a frame by the access terminal for filling in a gap in the frame between data transmissions when the gap is detected by the access terminal, wherein the packet comprises an identifier known to both the access terminal and the access point, and wherein a resource assignment message is transmitted from the means for communicating to at least one of the one or more access terminals, wherein the resource assignment message comprises the assigned erasure sequence durations for each of the one or more access terminals, and wherein no data transmissions occur with the one or more access terminals during the erasure sequence duration.

33. The apparatus of claim 32, wherein information received from the one or more access terminals relates to one or more of respective capabilities, estimates of respective downlink channel conditions, and subscriber data associated with each of the access terminals.

34. The apparatus of claim 32, wherein the resource assignment message comprises a sticky assignment.

35. The apparatus of claim 32, wherein the resource assignment message is a group assignment message transmitted to a group comprising at least one of the one or more access terminals, the resource assignment message conveying information regarding resources assigned to the group.

36. The apparatus of claim 32, wherein the means for estimating further comprise means for employing current context data from received transmissions or historical data associated with users employing the one or more access terminals to determine the erasure sequences durations.

37. The apparatus of claim 32, wherein at least one of the one or more access terminals implements at least one of MIMO (multiple input multiple output) and SIMO (single input multiple output) for communications.

38. The apparatus of claim 37, wherein the at least one access terminal implementing one of MIMO and SIMO transmits a plurality of data streams, the data streams being associated with different QoS (quality of service) parameters.

39. The apparatus of claim 38, wherein the means for assigning further comprise means for assigning different values of erasure sequence durations to each of the plurality of data streams that have been assigned resources in sticky assignments.

40. The apparatus of claim 32, wherein the means for estimating further comprise means for tracking variations in the one or more attributes of the one or more access terminals and varies erasure sequence durations to the one or more access terminals based on respective variations in the one or more attributes.

41. A method of communication that facilitates erasure detection, comprising:
  transmitting, to an access point, one or more attributes, wherein the one or more attributes relate to one or both of a size of bandwidth to be assigned to an access terminal and a traffic model of the access terminal;
  receiving erasure sequences durations for one or more erasure sequences, the erasure sequence durations being determined based on the transmitted one or more attributes, wherein each of the one or more erasure sequences comprises a packet comprising an identifier known to both the access terminal and the access point;
  detecting a gap in a frame between data transmissions;
  adding the packet to the frame for filling in the gap between the data transmissions, wherein the erasure sequence durations are received in a message conveying information regarding resource assignments to the access terminal, and wherein no data transmissions occur with the access terminal during the erasure sequence durations; and
  transmitting the data packets alternated with erasure sequences of the received durations.

42. The method of claim 41, wherein the assignment is a sticky assignment.

43. The method of claim 41, further comprising varying the erasure sequence durations while transmitting the data packets based on variations in the one or more attributes.

44. The method of claim 41, further comprising implementing one of MIMO (multiple input multiple output) and SIMO (single input multiple output) system at the access terminal such that data streams with different attributes transmit data packets with erasure sequences of different durations based on respective attributes of the data streams.

45. An apparatus for erasure sequence detection, comprising:
   one or more communication components, comprising hardware, associated with an access terminal to transmit and receive information, wherein the one or more communication components are configured to transmit, to an access point, one or more attributes associated with the access terminal, and wherein the one or more attributes relate to one or both of a size of bandwidth to be assigned to the access terminal and a traffic model of the access terminal; and
   a processing component configured to:
      receive erasure sequence durations for one or more erasure sequences from an access point, the erasure sequence durations being determined based on the one or more attributes, wherein each of the one or more erasure sequences comprises a packet comprising an identifier known to both the access terminal and the access point;
      detect a gap in a frame between data transmissions; and
      add the packet to the frame for filling in the gap between the data transmissions, wherein the erasure sequences durations are received in a resource assignment message that conveys assignment of resources to the access terminal, and wherein no data transmissions occur with the access terminal during the erasure sequence durations.

46. The apparatus of claim 45, wherein the assignment is a sticky assignment.

47. The apparatus of claim 45, wherein a plurality of the communication components transmit a plurality of data streams and the processing component processes data packets such that the data packets of different data streams are each alternated with respective received erasure sequences of different durations, based on attributes associated with respective data streams.

48. A non-transitory processor readable medium comprising:
   instructions for causing a processor to transmit, to an access point, one or more attributes associated with an access terminal, wherein the one or more attributes relate to one or both of a size of bandwidth to be assigned to the access terminal and a traffic model of the access terminal;
   instructions for causing the processor to receive erasure sequence durations for one or more erasure sequences, the erasure sequence durations being determined based at least on the transmitted one or more attributes, wherein each of the one or more erasure sequences comprises a packet comprising an identifier known to both the access terminal and the access point;
   instructions for detecting a gap in a frame between data transmissions;
   instructions for adding the packet to the frame for filling in the gap between data transmissions, wherein the erasure sequence durations are received in a message conveying information regarding resource assignments to the access terminal, and wherein no data transmissions occur with the access terminal during the erasure sequence durations; and
   instructions for causing the processor to transmit data packets alternated with erasure sequences of the received durations.

49. The processor readable medium of claim 48, wherein the resource assignment message comprises a sticky assignment.

50. The processor readable medium of claim 49, further comprising instructions for causing the processor to vary the erasure sequence durations based on variations in the one or more attributes.

51. An apparatus for improving erasure sequence detection, comprising:
   means for transmitting, to an access point, one or more attributes associated with an access terminal, wherein the one or more attributes relate to one or both of a size of bandwidth to be assigned to the access terminal and a traffic model of the access terminal;
   means for receiving erasure sequence durations for one or more erasure sequences, wherein the erasure sequences durations are determined based at least on the one or more transmitted attributes, wherein each of the one or more erasure sequences comprises a packet comprising an identifier known to both the access terminal and the access point;
   means for detecting a gap in a frame between data transmissions;
   means for adding the packet to the frame for filling in the gap between the data transmissions, and wherein the erasure sequences durations are received in a resource assignment message that conveys assignment of resources to the access terminal; and
   means for employing the received durations in generating erasure sequences for transmission, wherein no data transmissions occur with the access terminal during the erasure sequence durations.

52. The apparatus of claim 51, wherein the resource assignment message comprises a sticky assignment.

53. The apparatus of claim 51, wherein the means for transmitting further comprise means for transmitting a plurality of data streams, and wherein the means for employing further comprises means for processing data packets such that data packets of different data streams are alternated with erasure sequences of different durations based at least on the one or more attributes associated with respective data streams.

54. The apparatus of claim 51, wherein the means for transmitting further comprise means for transmitting data packets alternated with erasure sequences of the determined durations.

\* \* \* \* \*